UNITED STATES PATENT OFFICE.

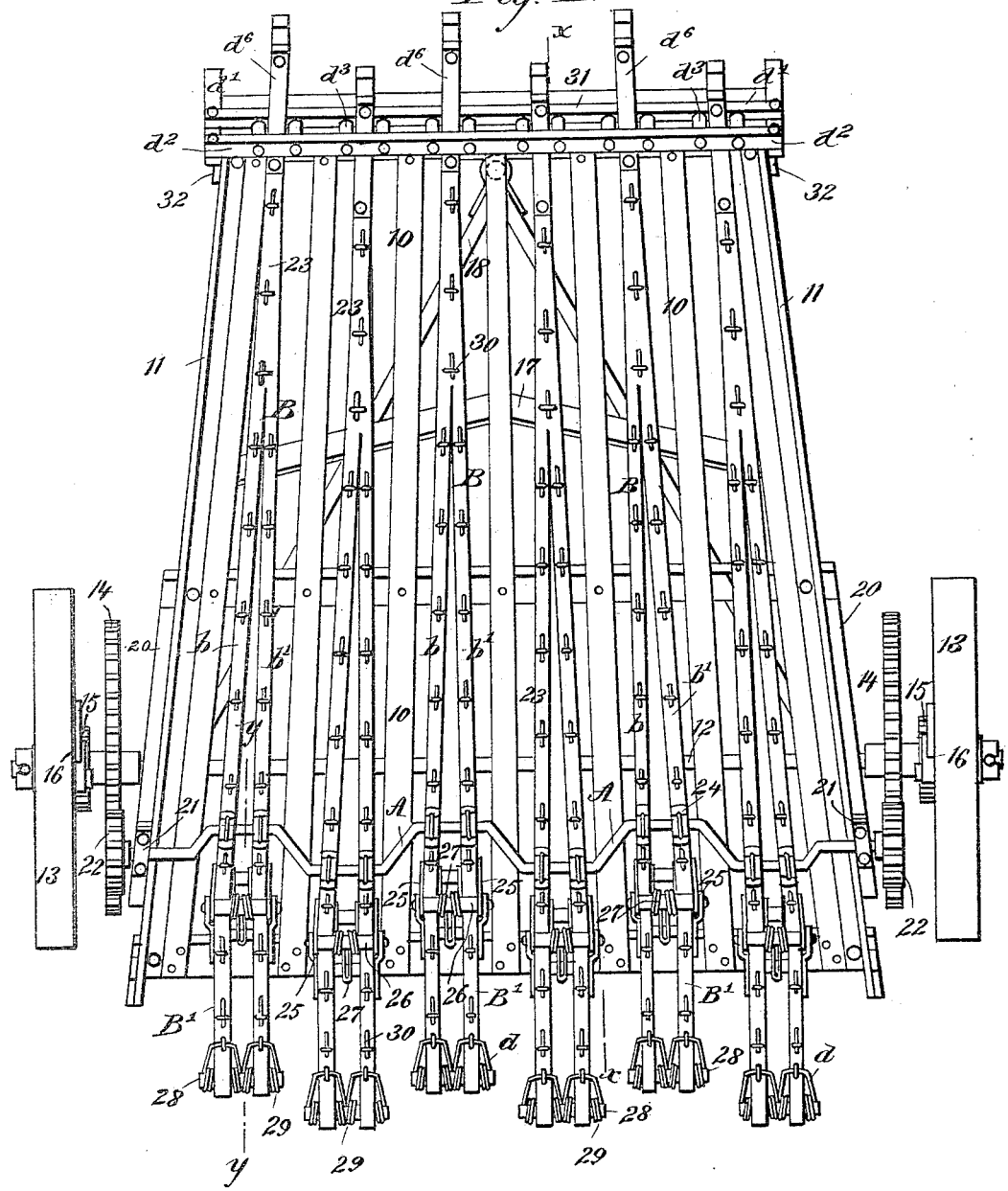

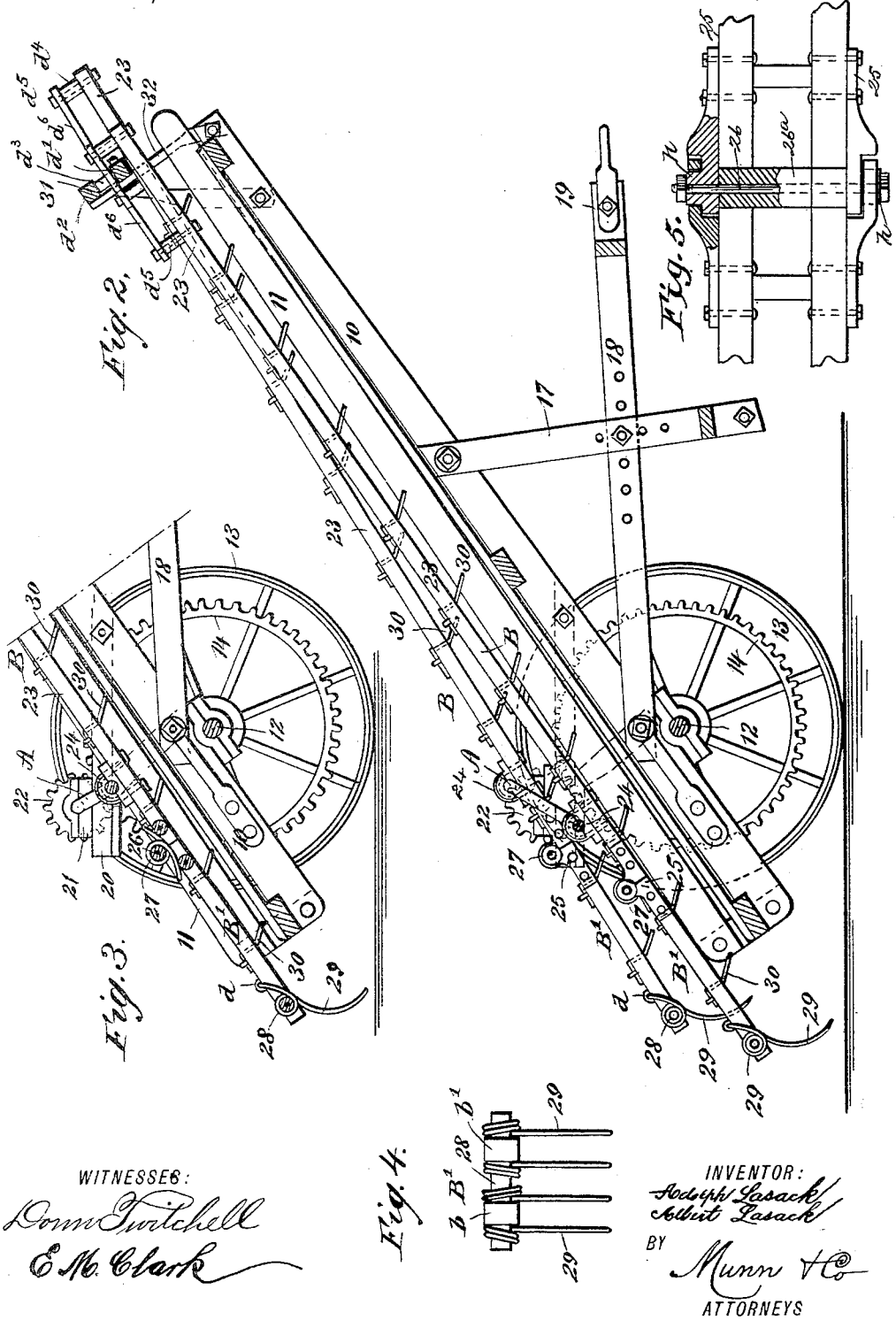

ADOLPH LASACK AND ALBERT LASACK, OF OXFORD JUNCTION, IOWA.

HAY-LOADER.

SPECIFICATION forming part of Letters Patent No. 453,492, dated June 2, 1891.

Application filed October 29, 1890. Serial No. 369,656. (No model.)

*To all whom it may concern:*

Be it known that we, ADOLPH LASACK and ALBERT LASACK, of Oxford Junction, in the county of Jones and State of Iowa, have invented a new and useful Improvement in Hay-Loaders, of which the following is a full, clear, and exact description.

Our invention relates to hay-loaders, and has for its object to simplify the construction of the implement shown and described in the Letters Patent granted to Adolph Lasack, No. 428,844, and dated May 27, 1890, the main features of the improvement being to provide for the implement but one crank-shaft; to so construct the feed-arms that they will practically correspond in shape to the shape of the bed over which they travel, thus materially increasing their working area, and, further, to construct said arms in spring-controlled sections and to so form one of the sections of each arm that one extremity thereof will serve as a rake-head.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a central vertical section taken practically on the line $x$ $x$ of Fig. 1. Fig. 3 is a partial vertical longitudinal section taken on the line $y$ $y$ of Fig. 1, and Fig. 4 is a rear end view of one of the feed-arms. Fig. 5 is a detail view of a hinge employed to unite the sections of the feed-arms.

The body of the implement consists of a slatted bed 10 of greater width at the bottom than at the top, the said bed being provided with side boards 11. The body is mounted near its rear end upon an axle 12, and upon the extremities of the axle drive-wheels 13 are loosely mounted, which drive-wheels also serve as supporting-wheels.

Any suitable form of construction may be adopted for the outer faces of the drive-wheels to prevent them from slipping.

Between each extremity of the axle and side of the body a spur-wheel 14 is rigidly attached to the axle, and near the inner face of the hub of each drive-wheel a ratchet-wheel 15 is keyed or otherwise fixed upon the axle. The ratchet-wheels 15 are engaged by dogs 16, pivoted upon the hubs of the drive-wheels, the engagement occurring when the implement is drawn forward. The dogs are held normally in engagement by the ratchet-wheels by any approved form of spring.

The body is held in an upwardly-inclined position at an angle to the surface over which it travels, usually by means of a V-shaped brace 17, in conjunction with a tongue 18, the members of the brace being adjustably secured to the sides of the body, between the upper end thereof and the axle, by bolts and nuts or their equivalents. The said brace extends vertically downward, and is adapted for engagement with the ground when the implement is lowered. The members of the brace are also preferably provided with a series of horizontally-aligning apertures, as shown in Fig. 2. The tongue 18 is also V-shaped, and is horizontally located, the apex of the tongue being placed at the forward portion of the implement, and the members thereof being pivotally attached to the side pieces of the body, preferably over the axle. The pivotal connection is usually made with the forward end of bracket-bars secured directly to the side pieces 10, as shown in Figs. 2 and 3.

At the forward end of the apex of the tongue any suitable form of clevis 19 is attached, and the V-shaped brace 17 passes downward between the members of the tongue, and the members of the brace and tongue are secured together by a readily-removable bolt provided with a suitable nut. Thus the tongue acts as a brace, and both the brace and tongue form a secure support for the implement. The apex or lower end of the brace 17 is adapted to rest upon the ground only when the implement is not in use, as when the implement is attached to a wagon or other vehicle in the customary manner the brace is elevated some distance from the ground, as illustrated in Fig. 2. The members of the tongue are provided with a series of apertures, as is also shown in Fig. 2.

The implement may be raised or lowered to change its inclination by withdrawing the bolt connecting the brace and tongue and carrying the latter in the direction of the front or rear of the implement, or vertically upward or downward, as may be desired. The rear ends of the tongue are virtually pivoted upon the body of the implement, and the upper connection of the brace with the body is also a pivotal one, as the members are bolted in a loose manner. By reason of this construction, when the brace and tongue are disengaged, the brace may be carried back under the body, which is desirable when the implement is being carried to or from the field, and the tongue may be made to support the body, which renders the implement in good shape for housing. A bracket-bar 20 is attached to each side of the body at a point forward of the axle, and each of the said bracket-bars is made to extend rearward beyond and over the side board of the body and over and beyond the axle.

Upon each bracket-bar at a point slightly back of the axle a journal-box 21 of any approved construction is located, and in the said journal-boxes the extremities of a crank-shaft A are held to revolve. The ends of the crank-shaft project beyond the journal-boxes, and upon each extremity of said shaft a pinion 22 is firmly secured, which pinions mesh with the spur-gears 14.

To each arm of the crank-shaft A a feed bar or arm 23 is pivotally attached, the attachment being effected by means of journal-boxes 24, secured upon the upper faces of the arms, through which journal-boxes the crank-arms of the shaft pass. The feed-arms 23 extend longitudinally of the implement over the bed, and are preferably of greater length than the bed. The feed-arms are of peculiar construction. Their upper ends are shaped as a single bar rectangular in cross-section, and from a point above the center of the arms to their outer or lower ends the said arms are bifurcated and comprise two members $b$ and $b'$. The space between the members of the arms is much greater at their lower ends than at the point where the bifurcation commences. Thus the bars are given somewhat of a triangular appearance in general contour and correspond practically to the shape of the bed.

Each arm comprises two sections B and B'. The section B is the upper section and is considerably longer than the lower section. The said upper section has attached thereto the journal-boxes receiving the crank-arms of the crank-shaft. The two sections B and B' are connected by hinges 25, the hinges being located at the sides of the sections and connected by a pintle 26, which pintle extends over the upper face of the sections.

In the construction of the hinges the hinged sections at one side of an arm are provided with a hollow hub $h$, which fits in an aperture produced in the opposite and engaging hinge-section, and one pintle is passed through the hubs of the hinges at opposite sides of the arms, as shown in Fig. 5. Thus, no matter how tight the bolt or pintle may be made, the hinges will have sufficient play. The pintle is preferably covered by a sleeve $26^a$, extending from one hinge of a set to the other.

Around the pintle-sleeve $26^a$ of each set of hinges a spring 27 is coiled, the ends of which spring are carried in opposite directions, one end being made to bear upon a stud or post located between the members of the upper section B of the arm near the lower end of said section, and the opposite end of the spring bears in like manner against a similar stud or post located between the members of the lower section B' of the arm, as is best shown in Figs. 1 and 3. A stud or post 28 is passed through the members of each lower section B' of the arms, the said stud or post being made to extend beyond the sides of the section, and the said stud or post is adapted to constitute a rake-head. Four rake-teeth 29 are preferably carried by each head 28, and each pair of teeth is preferably made from a single piece of spring metal in the following manner: The spring metal, which usually consists of stout wire, is bent practically to a U shape, forming a yoke $d$, and the yoke is secured by a staple or other equivalent fastening device or devices to the upper face of one of the members of a lower arm-section B'. The wire is then bent around the head any desired number of times at each side of the member on which the yoke is secured, and the extremities of the wire are carried downward from the head and are curved at the same time forwardly, thereby constituting the rake-teeth, as is shown in Figs. 2 and 3. Each arm has projected downward from its under face a series of teeth 30, preferably forwardly bent. These teeth are usually made in angular form, the lower members being passed downward through suitable apertures in the arms and the horizontal members pressed upon the upper face of the arms and securely attached thereto.

The contracted upper ends of the feed-arms are capable of a longitudinal reciprocating movement in a guide-head 31, which guide-head is attached to the body of the implement at its upper end. The guide-head preferably consists of two spaced parallel bars $d'$ and $d^2$, which bars are connected by a series of vertical partitions $d^3$, so spaced that between each pair of partitions the upper end of one of the feed-arms may conveniently slide. The guide-head 31 is secured to the body, preferably through the medium of brackets 32, which brackets are secured to the sides of the body. The arms slide beneath the lower bar $d'$ of the head in order to prevent the hay from being caught thereby; but each feed-arm is provided at its upper end with a spacing-block $d^4$ and at the opposite side of the head with a second spacing-block $d^5$, the blocks being connected by a bar $d^6$, which bar passes between the upper and lower bars of the head, as shown in Fig. 2. By this construction each arm is effectually guided in its movement.

It will be observed that by reason of the spring-controlled hinge connection between the sections of each feed-arm the receiving ends of the arms are capable of carrying upward a large quantity of hay without exerting undue tension or strain upon them. When the arms are in one piece and perfectly rigid, they are capable of carrying upward only a given amount of hay, and should the teeth and rakes gather a larger quantity than that amount in carrying the increased bulk upward the arms and likewise the teeth are subjected to considerable tension, which often results in breakage. This disadvantage in construction is overcome in the implement described.

It will be further observed that by forming the rake teeth in the manner above set forth an extra rake-head is dispensed with and each of the feed-arms is made to carry a given set of teeth. These improvements, together with the disposition of the upper crank-shaft, materially lighten the structure without detracting from its strength and usefulness and render the entire construction so simple that the implement may be worked by an inexperienced person without danger of its becoming injured.

It will be understood that by reason of the feed-arms being pivotally connected with the crank-arms of the crank-shaft the depressed arms, when the shaft is revolved, will have an upward longitudinal movement close to the slats of the bed, and that the elevated arms will have a downward longitudinal movement some distance above the slats of the bed. The upward movement of the depressed arms serves to carry up the gathered hay, and the downward movement of the elevated arms brings the said arms in position to gather the hay and effectually prevents the teeth 30, carried by the elevated arms, from engaging with the hay upon the bed and thereby interfering with its upward progress. When all of the crank-arms of the crank-shaft are in the horizontal position, each of the feed-arms is in the same plane; but the very moment that the crank-arms of the shaft approach a vertical position each alternate feed-arm is depressed and the others are elevated.

Motion is communicated to the crank-shaft through the medium of the drive-wheels as the implement is moved forward, the said drive-wheels imparting movement to the axle and the axle transfers movement to the spur-gears 14, which spur-gears impart movement to the shaft through the medium of the pinions 22.

It will be observed that the feed-arms are not in the least obstructed at their upper ends in their longitudinal movement, and if in practice it be found desirable any possibility of detrimental friction may be overcome by providing the partitions between which the arms slide with friction-rollers located in such manner as to engage with the side edges of the arms.

Having thus described our invention, we claim as new and desire to secure by Letters Patent—

1. In a hay-loader, feed-arms constructed in sections connected by spring-controlled hinges, the pressure of the springs being exerted downward upon the lower or rear sections of the arms, and rake-teeth connected with the spring-pressed sections of the arms, as and for the purpose specified.

2. In a hay-loader, the combination, with a bed, of feed-arms held to reciprocate over the bed, said feed-arms comprising two sections, spring-controlled hinges connecting the sections of the arms, the springs of said hinges being arranged to exert downward pressure upon the rear sections of the arms, the downward movement of the said spring-pressed sections being limited to their forming essentially straight continuations of the upper sections, teeth projected downward from the upper faces of both sections of the arms, rake-heads secured to the lower sections of the arms, and rake-teeth secured to the said heads, substantially as described.

3. In an implement of the character described, the combination, with the bed thereof, of feed-arms adapted to longitudinally reciprocate over the bed, the said feed-arms constructed of two sections connected by spring-controlled hinges, the lower section comprising two members throughout its length, and the upper section two members for a portion of its length, teeth projected downward from the lower faces of the arms, a rake-head constructed integral with the lower end of the lower section of each arm, and rake-teeth attached to the said head, substantially as shown and described.

ADOLPH LASACK.
ALBERT LASACK.

Witnesses:
L. ZELLER,
N. O. HENDERSON.